(12) United States Patent
Nanri et al.

(10) Patent No.: US 6,471,619 B2
(45) Date of Patent: Oct. 29, 2002

(54) TRANSMISSION CONTROL METHOD

(75) Inventors: Takehiko Nanri; Kunihiko Fukui, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/821,075

(22) Filed: Mar. 30, 2001

(65) Prior Publication Data

US 2001/0041645 A1 Nov. 15, 2001

(30) Foreign Application Priority Data

Mar. 31, 2000 (JP) ........................ 2000-099454

(51) Int. Cl.[7] .................... F16H 59/70; F16H 61/40; F16H 59/06; F16H 61/12; F16H 47/02
(52) U.S. Cl. .................... 477/52; 60/327; 477/68; 477/908; 74/335
(58) Field of Search .............. 477/52, 38, 41, 477/37, 58, 908, 906, 907, 68; 701/51, 55, 56, 62–64; 74/731.1, 335, 336 R, 732.1; 60/327, 487; 200/61.91

(56) References Cited

U.S. PATENT DOCUMENTS

2001/0036881 A1 * 11/2001 Nanri et al. .................. 477/68
2001/0037697 A1 * 11/2001 Nanri et al. .................. 74/335
2001/0039800 A1 * 11/2001 Nanri et al. .................. 60/487
2001/0041645 A1 * 11/2001 Nanri et al. .................. 477/68

FOREIGN PATENT DOCUMENTS

| JP | A882354 | 3/1996 |
|----|---------|--------|
| JP | B2527199 | 6/1996 |
| JP | 9-203460 | 8/1997 |

* cited by examiner

Primary Examiner—Douglas C. Butler
(74) Attorney, Agent, or Firm—Birch, Stewart, Kolasch & Birch, LLP

(57) ABSTRACT

A variable transmission system includes a continuously variable transmission, a shiftable sub-transmission in series with an output of the continuously variable transmission, and controller. A sensor senses a position of a driver's shift lever, and another sensor senses a gear position of the shiftable sub-transmission. The sensors report to the controller. If both sensors detect reverse drive conditions, the controller adjusts an angle of a swash plate of the continuously variable transmission for the reverse driving direction. If only one of the sensors indicates a rear drive condition, the controller compares an engine speed to a threshold value. If the engine speed exceeds the threshold value, the controller curbs the engine speed by cutting off the ignition.

20 Claims, 7 Drawing Sheets

TRANSMISSION CONTROL METHOD

BACKGROUND OF THE INVENTION

1. Field of the Invention

The present invention relates to an automatic transmission for a vehicle, such as a hydrostatic continuously variable transmission in which a fixed capacity hydraulic pump and a variable capacity hydraulic motor are connected by a hydraulic closed circuit. More particularly, the present invention relates to a method controlling the variable transmission and a sub-gear transmission.

2. Description of the Relevant Art

Hydrostatic continuously variable transmissions are well-known. Such transmissions are applied to various vehicles, such as motorcycles. Japanese Patent No. 2527199 describes a control method for a hydrostatic continuously variable transmission, in which an actual rotation speed (Ne) of a crankshaft, or the like, is compared with a target rotational speed (Ne), which has been determined in accordance with predetermined conditions. Output power is controlled by adjusting an inclination angle of a movable swash plate, based upon the comparison.

Japanese Patent Laid-Open No. Hei 8-82354 discloses a control method for a continuously variable transmission in which a gear ratio is controlled in a step-by-step manner, as in a manual multi-step transmission (this method is called "multi-stage variable transmission control").

When a throttle is closed during downhill driving, for example, the foregoing continuously variable transmission holds the gear ratio at a value immediately prior to downhill driving in order that the vehicle can smoothly decelerate.

Japanese Patent Laid-open No. Hei. 9-203460 discloses a gear control apparatus for a continuously variable transmission capable of multi-stage gear control. The apparatus is provided with a mode switch, and the multi-stage transmission control starts upon setting of the mode switch to multi-stage gear mode, and the gear control similar to a manual multi-stage transmission starts operating upon operation of a shift lever to select a predetermined target gear ratio with a prescribed number of stages.

The prior art suffers several drawbacks. In reverse driving utilizing the transmission apparatus, when the sub transmission lever of the driving range switch is set to the R range, being a reverse position, the gear position detection switch in the sub transmission case activates in co-operation with the sub transmission lever and detects a reverse traveling condition of the vehicle, and in the event that reverse driving is detected, the gear ratio is fixed as far as possible on the LOW side (e.g., with an output/input transmission ratio relatively low).

With the structure of the related art mentioned above, if the sub transmission lever is switched to the R range while the gear position detect switch is damaged, it will indicate the D or L range despite it actually being in the reverse driving position, the transmission cannot determine the reverse driving state, and in the event that the automatic gear mode is selected, the gear ratio may set to the TOP side and the vehicle may be accelerated unnecessarily and unwantedly. Also, in the event that stepped gear mode is selected, the gear ratio may be changed by the operation of the shift switch and the vehicle body may be accelerated too much. Therefore, there exists a need in the art for a highly reliable reverse control method, which functions even in the event of damage to the gear position detect switch.

SUMMARY OF THE INVENTION

It is an object of the present invention to solve one or more of the drawbacks associated with the background art.

It is a further object of the present invention to provide a highly reliable reverse control method, which functions even in the event of damage to the gear position detect switch.

A first aspect of the present invention concerns a transmission control method for controlling a transmission having a continuously variable transmission and a sub gear transmission arranged in series. A gear position detect switch is provided on the sub gear transmission. A reverse position detect switch is provided on a side of a change lever of the sub gear transmission. When both a gear position detect switch signal and a reverse position detect switch signal detect a reverse state, a reverse travel state is determined and a reverse control method is executed.

A second aspect of the present invention concerns a transmission control method for controlling a transmission having a continuously variable transmission and a sub gear transmission arranged in series. A gear position detect switch is provided on the sub gear transmission. A reverse position detect switch is provided on a side of a change lever of the sub gear transmission. When either one of a gear position detect switch signal or a reverse position detect switch signal detect a reverse state, the engine speed is controlled so that a specified engine speed is not exceeded.

With the method disclosed in the first aspect of the invention, a reverse driving state will be determined and reverse control will be performed only in the event that both of a gear position detect switch equipped on the sub gear transmission and the reverse position detect switch on the sub transmission lever detect the reverse driving state. The reverse control will not start in the case where either of the gear position detect switch or the reverse position detect switch is damaged, so that acceleration in the event of reverse driving can be prevented. Therefore it is effective in the event of damage to the gear position detect switch, and is possible to provide highly reliable reverse control.

With the method disclosed in the second aspect of the invention, engine speed will be controlled so as not to exceed the prescribed engine speed in the event that only one of the gear position detect switch equipped on the sub gear transmission and the reverse position detect switch on the sub transmission lever detect the reverse driving state. In a case where the sub transmission lever is shifted to a reverse position, and the reverse position detect switch detects the reverse driving state, and at the same time where the gear position detect switch is damaged and indicates the gear ratio on the forward side, the acceleration in the event of reverse driving can be prevented. Therefore it is also possible to provide highly reliable reverse control.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
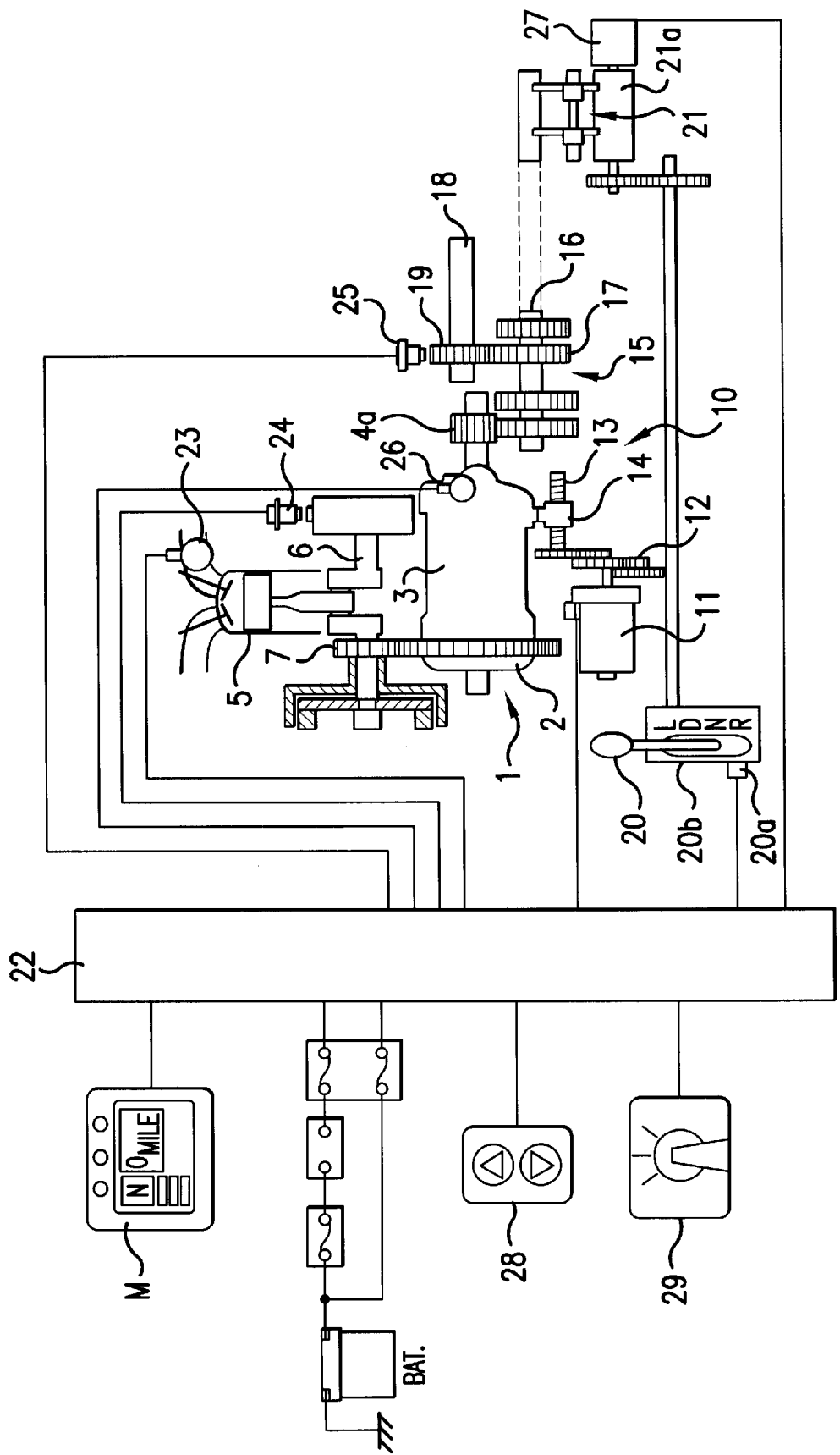
FIG. 1 illustrates a control system, in accordance with the present invention.

Referring to FIG. 1, a hydrostatic continuously variable transmission 1 comprises a fixed capacity hydraulic pump 2 and a variable capacity hydraulic motor 3 integrally provided on a drive shaft 4, with the fixed capacity hydraulic pump 2 and the variable capacity hydraulic motor 3 being connected by a hydraulic closed circuit. A drive gear 7 provided on a crankshaft 6 of an engine 5 rotates a driven gear 8 of the fixed capacity hydraulic pump 2, thereby providing hydraulic pressure thereto. This hydraulic pressure rotates the variable capacity hydraulic motor 3 at a variable speed, which transmits a changed output to the drive axle 4. A gear ratio can be arbitrarily changed by the inclination angle control mechanism 10 which changes an inclination angle of the movable swash plate (to be described later) of the variable capacity hydraulic motor 3.

The inclination control mechanism 10 transmits the output of a control motor 11 via a linkage system, including a reduction gear 12, and changes the inclination angle of the movable swash plate built into the variable capacity hydraulic motor 3 through a threaded rod and follower, such as a ball screw 13 and a slider 14. The transmission output of the hydrostatic continuously variable transmission 1 is transmitted from an output gear 4a of the drive axle shaft 4 to a sub gear train 15, being a secondary reduction gear train. A transmission output of sub gear train 15 is transmitted from an output gear 17 on a transmission shaft 16 to a final output gear 19 on a final output shaft 18.

The sub gear train 15 is switched by manually operating a sub-transmission lever 20 mounted on a drive range change-over switch 20b to drive a shifter 21, so that each shift position of L or D on the forward side, reverse R, or neutral N can be selected. The range L is for driving at low speed, the range D is for driving at normal or ordinary speed, N is for neutral, and R is for reverse driving. When the shift position R is selected, the gear ratio is fixed at a LOW ratio (e.g. a ratio of transmission output/input is relatively lower).

Each of the L and D shift positions on the forward side can be switched to various drive modes (to be described later) by a mode map switch 29 provided on a steering handle. The drive modes roughly comprise an automatic shift mode and a multi-stage variable transmission mode. When the variable transmission is selected, shift-up and shift-down can be manually performed by operating a shift switch 28 provided on the handle.

Figure 7:
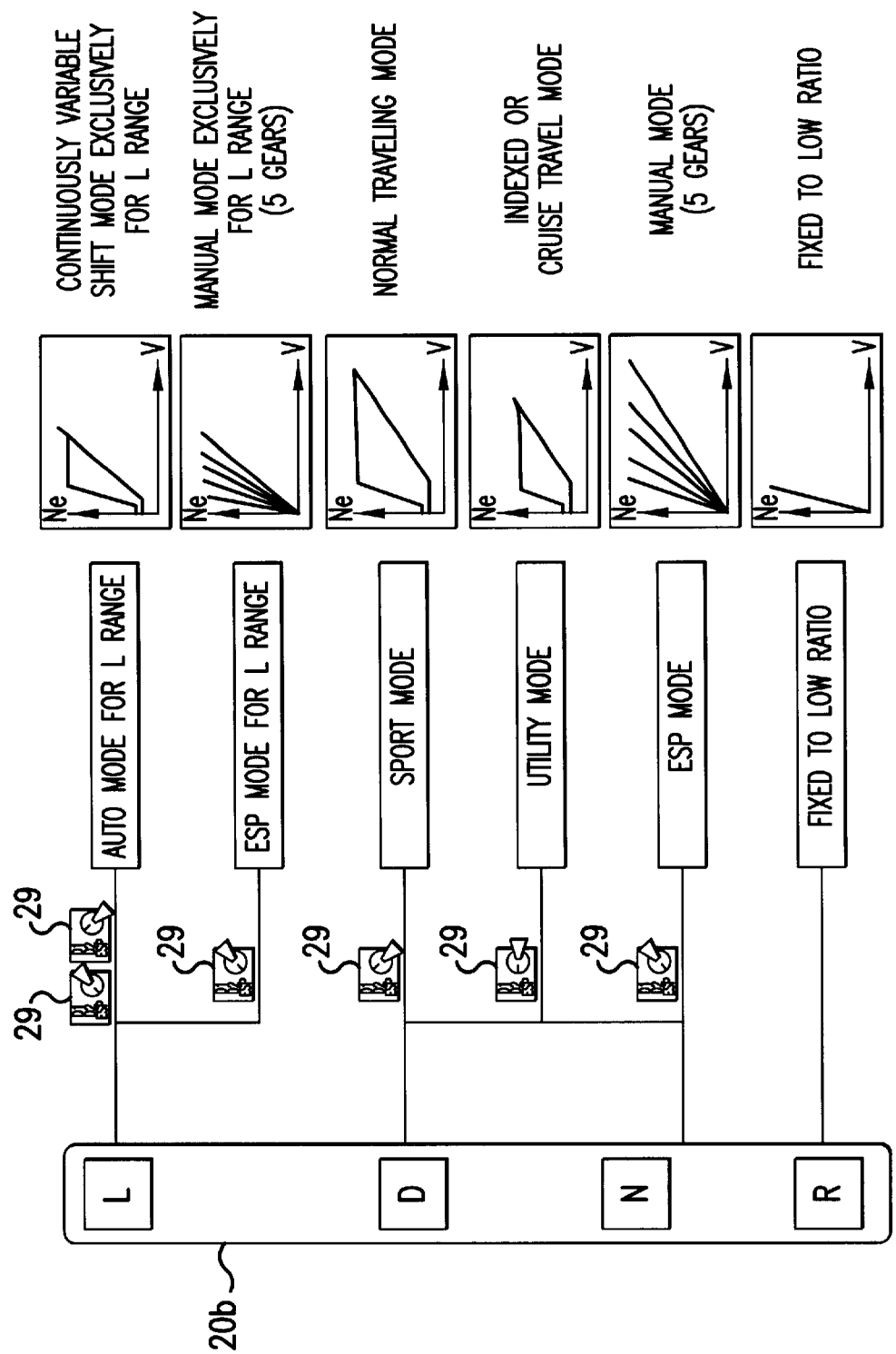
FIG. 7 is a diagram of various modes.

FIG. 7 describes predetermined drive modes. When the L range is selected by the sub-transmission lever 20, the mode map switch 29 is switched to D1 or D2, and a mode is changed to an L range auto mode of the continuously variable transmission mode dedicated to the L range. Further, when the mode map switch 29 is switched to ESP, the mode is changed to an L range ESP mode of the manual mode dedicated to the L range, enabling manual change of 5 gears on the forward side.

When the D range is selected, the mode map switch 29 is switched to D1, and a sports mode suitable for normal driving is selected. When the mode map switch 29 is switched to D2, a utility mode suitable for pulling trailers or cruising is selected. When switched to ESP, the manual mode for normal driving is adopted, in which it is possible to manually change 5 gears on the forward side.

In the continuously variable transmission and multi-stage variable transmission, the gear ratio is actually changed by inclination angle control. The inclination angle control is performed by a control unit 22, which controls the operation of the control motor 11 of the inclination angle control mechanism 10, based on signals from various sensors. In addition, the control unit 22 outputs display signals to indicators of an instrument panel M, and is provided with power from a battery on the vehicle.

As shown in the FIG. 1, the control unit 22 receives for the inclination control mechanism 10 the following signals, which are a throttle angle signal from a throttle sensor 23 mounted on the intake side of the engine 5, an Ne signal from a rotation sensor 24 located near the crankshaft 6, a vehicle speed signal from a speed sensor 25 located near the final output gear 19, an inclination angle signal from an angle sensor 26 provided at the variable capacity hydraulic motor 3, shift position signals from a shift sensor 27 integrated with a shift drum 21a of a shifter 21 so as to detect shift positions, and signals from the shift switch 28 and mode map switch 29 provided in the steering wheel. Further, the control unit 22 receives a signal from a lever switch 20a located at the lower part of a sub-transmission lever 20 of the drive range change-over switch 20b.

Figure 2:
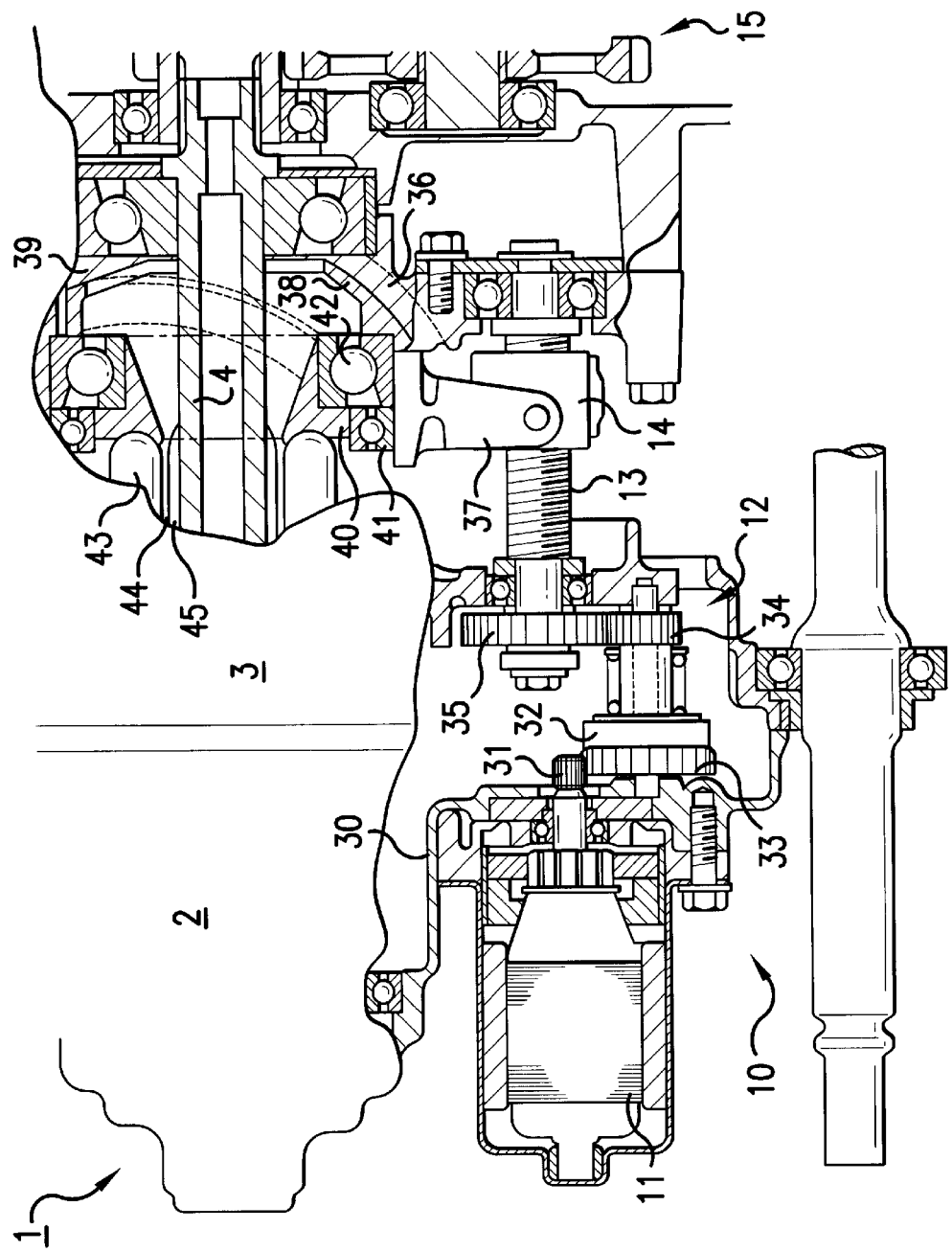
FIG. 2 is a partial cross sectional view illustrating mechanical components for inclination angle control of a movable swash plate, in a hydrostatic continuously variable transmission.

Next, a description is given of the inclination angle control mechanism 10 shown in FIG. 2. The control motor 11, of the inclination angle control mechanism 10, is supported by a housing 30 of the fixed capacity hydraulic pump 2. An output of the control motor 11 is transmitted to a ball screw drive gear 35 from a gear 34 through an input gear 33 of a torque limiter 32. The input gear 33 is driven by an output gear 31 of the control motor 11. The ball screw drive gear 35 rotates together with the ball screw 13. As the ball screw 13 rotates forward or backward, the slider 14 having a nut slides on the shaft in either direction. Both ends of the ball screw 13 are supported by a housing 36 of the hydraulic motor 3.

An arm 37 extending from the housing 36 has one end thereof rotatably attached to the slider 14, and the other end thereof integrated with a swash plate holder 38 supported in the housing 36. The swash plate holder 38 is rotatably supported on a concave surface 39 of the housing 36. When the arm 37 rotates, the swash plate holder 38 also rotates on the concave surface 39 and changes the angle of the movable swash plate 40.

The movable swash plate 40 is rotatably held against the inner side of the swash plate holder 38 via bearings 41 and 42, and by varying the angle of the swash plate holder 38, the inclination angle formed between a rotation surface of the movable swash plate 40 and the axis of the drive shaft 4 is altered. FIG. 2 illustrates an angle of 90°, which is a TOP state where the gear ratio is 1.0.

Hydraulic plungers 43 of the variable capacity hydraulic motor 3 are pressed against this movable swash plate 40. A plurality of hydraulic plungers 43 are provided in a peripheral direction of a rotating body 44, and are pushed out so as to press against the variable swash plate 40 side by the hydraulic pressure at the fixed capacity hydraulic pump 2 side. Rotational force is supplied to the rotating body 44 according to the inclination angle of the variable swash plate 40. The rotating body 44 is fitted on the drive shaft 4 using a spline joint 45, and the drive shaft 4 is driven to rotate by rotation of the rotating body 44.

Figure 3:
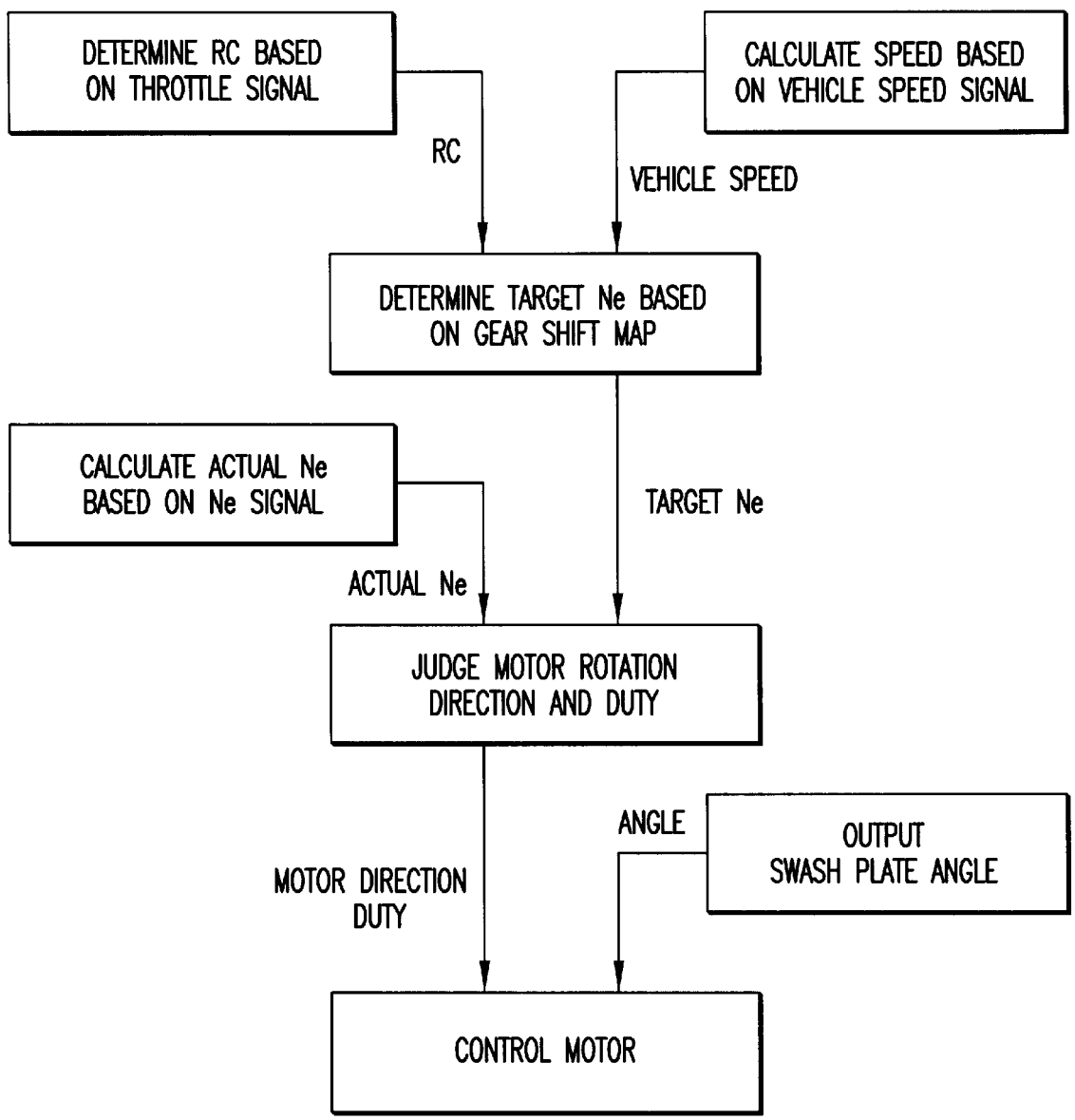
FIG. 3 is a flowchart of a continuously variable transmission control method.

Next, gear shift control for a continuously variable transmission in the control unit 22 will be described using FIG. 3. In step S101, RC (riding conditions) are created from a throttle signal sent from the throttle sensor 23. RC basically increases or decreases in accordance with the value of the throttle signal:

1. When the throttle is opened, RC increases;
2. When the throttle is closed, RC decreases.

Figure 4:
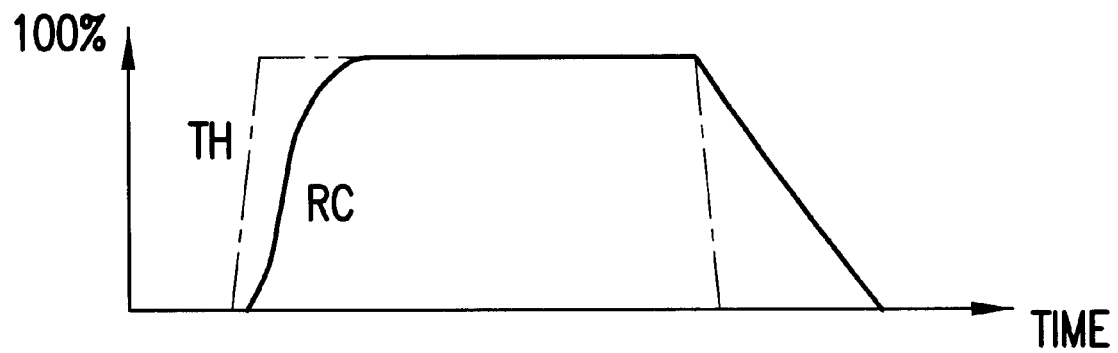
FIG. 4 is a graph used in determining RC (riding conditions)

In FIG. 4, TH stands for a throttle opening amount. The vertical axis represents the throttle opening amount and RC (each given as a %). The horizontal axis represents time.

Figure 5:
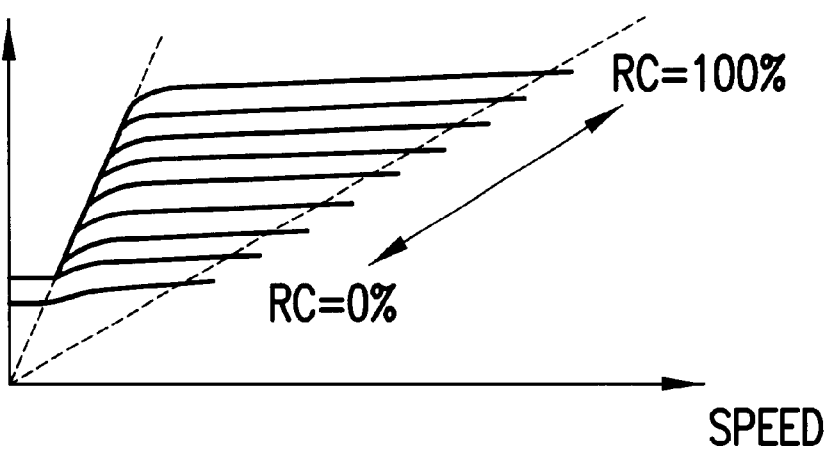
FIG. 5 is a graph illustrating a gear shift map.

In step S103, vehicle speed is calculated separately from a vehicle speed signal sent from the throttle sensor 25. Following, in step S105, a target Ne (e.g. rotation sped) is determined with reference to a previously built-in or stored gear shift map, based on the RC and the vehicle speed. One example of a gear shift map is shown in FIG. 5, in which a predetermined number of types have been prepared. For example, various modes such as L range exclusive, sports mode exclusive, utility mode exclusive etc. are stored, and these can be selected using the mode map switch 29.

In step S107, actual Ne is calculated from an Ne signal sent from the rotation sensor 24. In step S109, the actual Ne and the target Ne are compared, and it is determined whether the rotation direction of the control motor 11 should be forward or reverse, and DUTY is determined. Specifically, a determination is made for the movement direction of the movable swash plate as described in the following:

actual Ne>target Ne→movable swash plate is moved toward the TOP side;

actual Ne<target Ne→movable swash plate is moved toward the LOW side.

Duty is also determined from the following equation:

DUTY=K1×|actual Ne−target Ne|

(where K1 is a coefficient)

Here, duty represents a proportion or level of current flowing in the control motor 11, and is used in speed control of the control motor 11. With DUTY at 100% the control motor 11 is at maximum speed, while with DUTY at 0% the motor is stopped.

In step S113, the control motor 11 is controlled based on a rotation direction of the motor and a movable swash plate angle calculated based on DUTY and an angle signal from the angle sensor 26 (as determined in step S111). Specifically, the control motor 11 is driven using motor rotation direction and DUTY, each of the LOW and TOP ratios are measured using the movable swash plate angle, and at the time of disconnection from the TOP ratio, the control motor 11 is stopped.

In this embodiment, stepped gear shift control is possible using a stepped gear shift mode. Stepped gear shift control means gear shift control that can manually shift a gear ratio, such as a many stepped transmission, as if it were a continuously variable transmission. This type of stepped gear shift control is carried out by controlling an inclination angle of the movable swash plate 40 under control of the control unit 22 in the same way as for the case described up to now, but in this case it is sufficient to only change the control method so as to carry out stepwise gear shifting.

Switching between this type of stepped gear shift mode and the automatic gear shift mode is carried out by a mode switch 29, and a stepped gear shift operation when in stepped gear shift mode is carried out by pressing the shift switch 28. The shift switch 28 is provided with a shift up button and a shift down button, and each time one of these buttons is pressed the gears are shifted up or shifted down by one stage.

Figure 6:
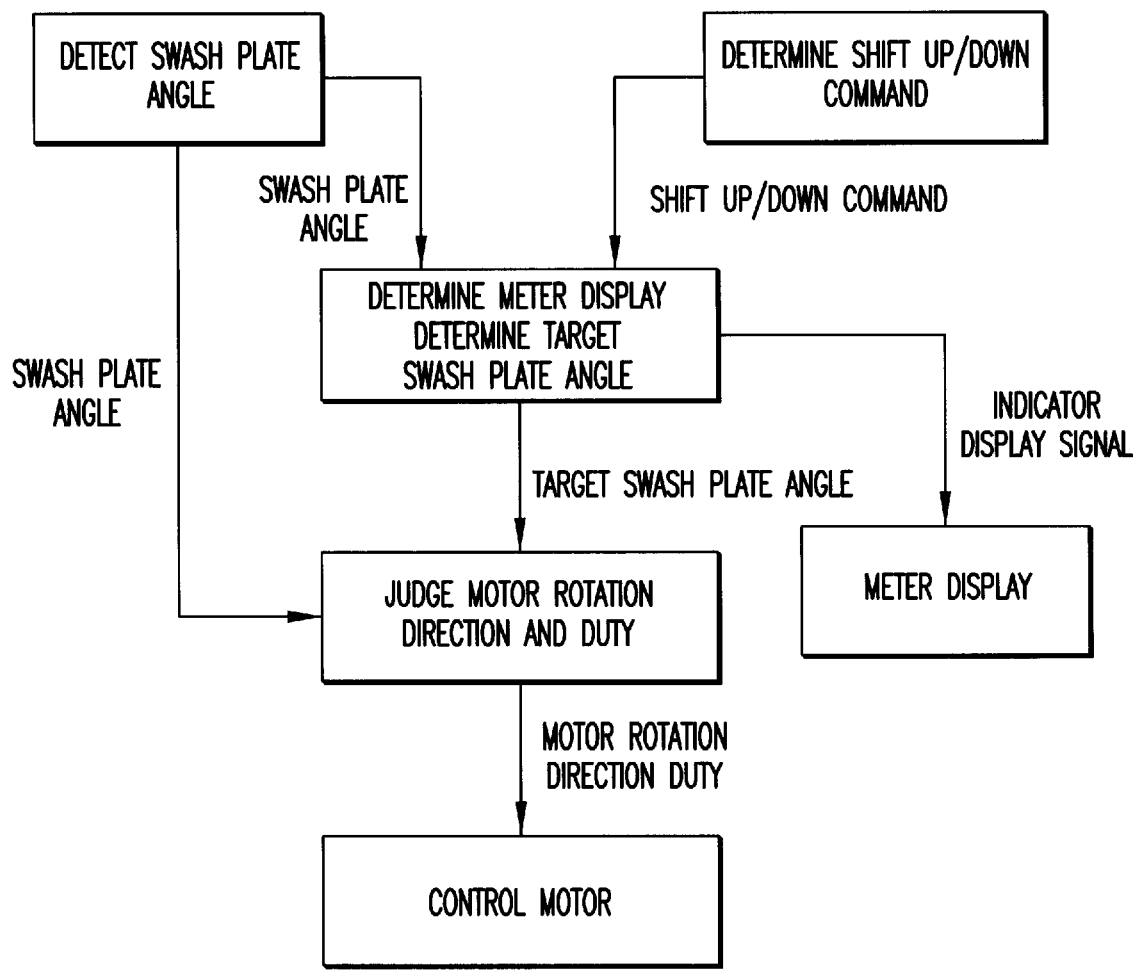
FIG. 6 is a flowchart of a multi-stage variable transmission control method.

FIG. 6 shows a control procedure of the control unit 22 for stepped gear shift control. In step S201, an inclination angle is calculated from the swash plate inclination angle signal from the angle sensor 26. In step S203, a shift command making the operation content shift up or shift down is determined using a shift signal from the shift switch 28. This determination sets a shift up command if the shift up button of the shift switch 28 is pressed, or sets a shift down command if the shift down button of the shift switch 28 is pressed.

In step S205, a meter display determination and a target swash plate angle are determined based on the above described inclination angle and shift command. The meter display determines a number of gear stages, which corresponds to a number of shift stages of a manual transmission, using the inclination angle. Next, the meter display determines a display signal to go to an indicator of the meter M, and outputs this signal to the meter M. In step S207, the determined number of gear stages is displayed on the meter M.

Determination of the target inclination angle for the swash plate 40 is established under the following conditions, with respect to a current gear display signal, when there is input of a shift command:

shift up command→single stage shift up shift down command→single stage shift down Following that, in step S209, the target swash plate angle (determined in step S205) is compared with the inclination angle (S201), and based upon the comparison the forward or reverse rotation direction of the control motor 11 and DUTY are determined from the following:

inclination angle>target swash plate angle→shift movable swash plate 40 toward the LOW side;

inclination angle<target swash plate angle→shift movable swash plate 40 toward the TOP side.

DUTY is determined from the following equation:

DUTY=K2×|inclination angle−target swash plate angle|

(where K2 is a coefficient)

Next, in step S211, the control motor 11 is drive controlled based on the motor rotation direction and the DUTY, to incline or decline the movable swash plate 40 to a specified angle. In this way, the hydrostatic continuously variable transmission 1 can carry out stepped gear shifting, which is corresponds to a stepped gear shifting of a manual multi-stepped transmission.

In accordance with the present invention, two reverse travel detection switches or means are provided. When the sub transmission lever 20 is set to the R range, a shift drum 21a acts on the sub gear transmission 15. A first reverse travel detection switch is a shift sensor 27. The shift sensor 27 is provided, so as to move or activate in response to the shift drum 21a.

A second reverse travel detection switch is a reverse switch 20a, provided beneath the sub transmission lever 20 and the drive range selection switch 20b. The reverse switch 20a is activated (e.g., ON) only when the sub transmission lever 20 is set to the R range.

The shift sensor 27 and the reverse switch 20a both detect the reverse traveling condition in a diverse manner. The control unit 22 only judges a reverse travel condition actually exists, and only carries out reverse control, when both the shift sensor 27 and the reverse switch 20a have a detection result indicating reverse travel. If only one of the shift sensor 27 and the reverse switch 20a detects a reverse travel condition, an abnormality is judged and the engine ignition is stopped to perform control so that engine speed does not exceed a fixed value. When both the shift sensor 27 and the reverse switch 20a do not detect the reverse travel state, normal gear shift control is carried out.

Figure 8:
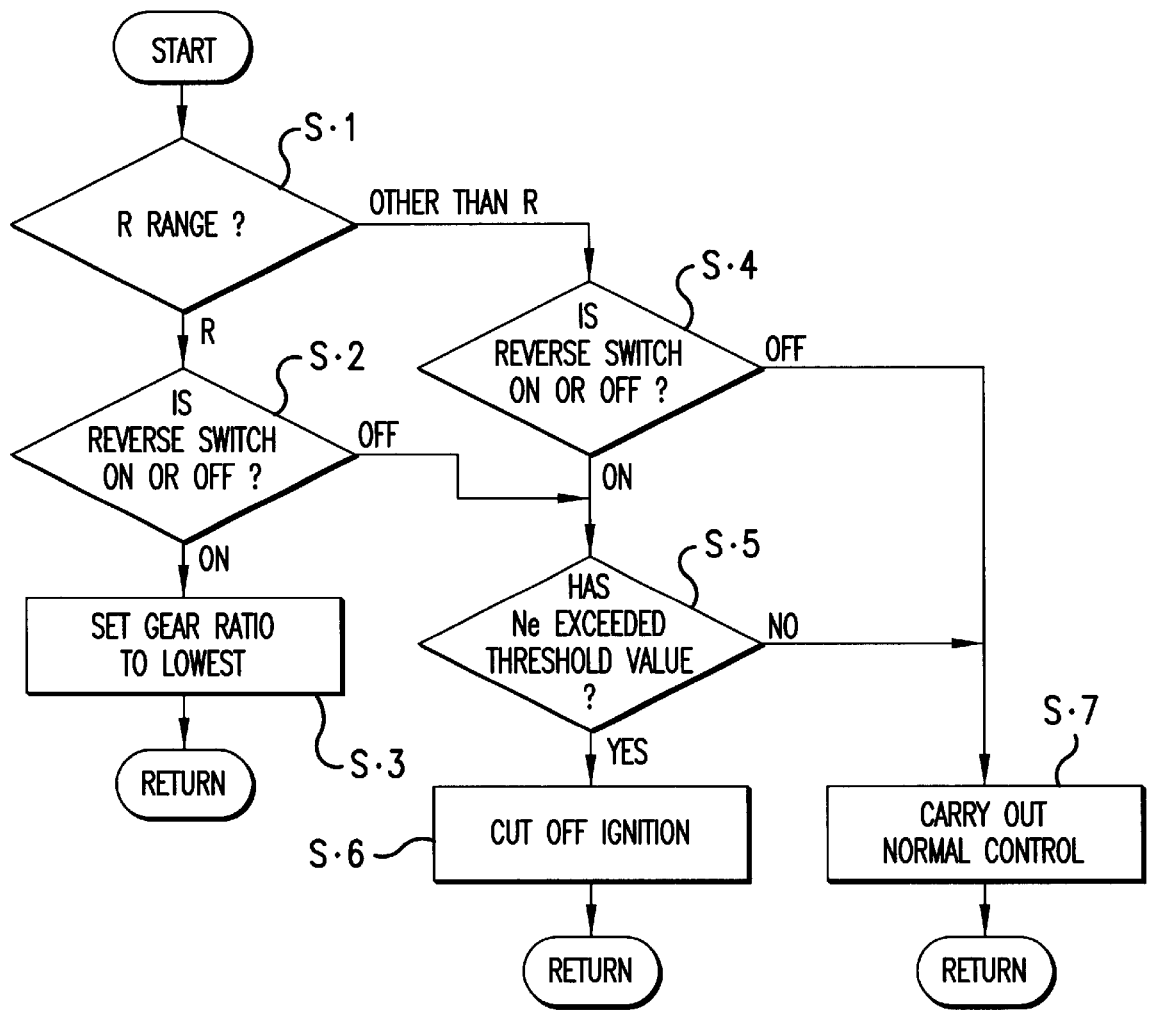
FIG. 8 is a flowchart illustrating a reverse control algorithm.

FIG. 8 is a flowchart illustrating a reverse control algorithm of the control unit 22. Once control starts, in step S1, it is judged whether or not the shift sensor 27 indicates the reverse travel R range. If so processing proceeds to step S2, where it is judged whether or not the reverse switch 20a is ON. If so, then both the shift sensor 27 and the reverse switch 20a detect the reverse travel condition, and processing goes to step S3. In step S3, the control unit 22 accepts that the reverse travel condition exists and controls the angle of the movable swash plate 40 so that the variable swash plate 40 is fixed as far as possible to the LOW side. After that, processing returns to the start level.

When the R range is not detected in step S1, specifically when it is detected that the condition is other than the reverse travel condition, processing goes to step S4. In step S4, it is judged whether or not the reverse switch 20a is ON. If the reverse switch is ON, an abnormal condition exists and processing goes to step S5. In step S5, it is judged whether or not the engine speed Ne has exceeded a specified threshold value. The judgment of step S5 is also carried out if it is judged in step S2 that the reverse switch 20a is OFF.

In step S5, if the engine speed has exceeded the specified threshold value, processing goes to step S6. In step S6, the engine speed is controlled to be below the specified threshold value by cutting off the engine ignition. After step S6, processing returns to the start.

If the engine speed has not exceeded the specified threshold value in step S5, processing goes to step S7. Also, if the shift sensor did not detect the reverse travel condition in step S1 and the reverse switch 20a did not detect the reverse condition in step S4, processing goes to step S7. In step S7, the control unit 22 carries out normal gear shift control. After step S7, processing then returns to the start. The threshold value of step S5 is arbitrarily set in a range where acceleration does not occur.

Since there are the two reverse travel detection means, in the event that there is a failure or error of one of the reverse travel detection means, the control unit 22 can judge an abnormality. For example, the shift sensor 27 that moves in response to the shifter 21 could be stuck in the D or L forward drive condition, however the lever switch 20a would still indicate a reverse travel condition. Further, if the sub-transmission lever 20 is moved to the R range and the lever switch 20a indicates this, however, if the shift sensor 27 indicates a non-reverse travel condition, the control unit 22 can judge an abnormality from the two detection signals.

On the other hand, when the two reverse travel detection means are not provided, contrary to the present invention, these advantages cannot be had. If reverse travel is undertaken in the above described failure states, the gear ratio is shifted to the TOP side in an automatic gear shift control mode, while in a stepped gear shift mode a shift up signal is input through a manual operation to shift the gear ratio to the TOP side. Either case results in increased vehicle speed.

In accordance with the present invention, failure of the shift sensor 27 can be reliably detected. Further, control is performed to temporarily stop the engine ignition, so that a specified rotation speed is not exceeded, which means that it is possible to easily handle such a failure mode. Further, it is possible to reliably prevent an increase in the vehicle's speed regardless of the type of gear shift mode. Also, since a gear shift ratio is only capable of normal reverse travel when both the reverse switch 20a and the shift sensor 27 have detected the reverse travel condition, it is possible to perform a highly reliable reverse control method.

The present invention is not limited to the above described embodiments, and various modifications and applications are possible. For example, it is possible for the present invention to apply not only to hydrostatic continuously variable transmission systems, but also to improved precision position detection system, such as a CTV system, or an electronically controlled belt conveyor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of controlling a variable transmission system, said method comprising the steps of:

providing a continuously variable transmission, a shiftable sub-transmission in series with an output of the continuously variable transmission, and controller;

sensing a position of a driver's shift lever;

sensing a gear position of the shiftable sub-transmission; and if both of said sensing steps indicate rear travel conditions, causing the controller to run a reverse travel control algorithm for the variable transmission system.

2. The method according to claim 1, wherein the continuously variable transmission includes a fixed capacity hydraulic pump and a variable capacity hydraulic motor connected by a hydraulic closed circuit, wherein a gear ratio of the continuously variable transmission is changed by altering an angle of a moveable swash plate.

3. The method according to claim 1, wherein the reverse travel control algorithm includes the steps of:

providing a control motor, and a linkage system intermediate the control motor and the movable swash plate;

activating the control motor; and moving the moveable swash plate, via the linkage system.

4. The method according to claim 3, wherein said step of moving the moveable swash plate includes changing the angle of the movable swash plate, so as to lower a transmission ratio of output/input for the continuously variable transmission.

5. The method according to claim 1, wherein said step of sensing a gear position of the shiftable sub-transmission includes:

providing a shift sensor located adjacent to a shifting element of the shiftable sub-transmission; and activating the shift sensor when the shifting element moves to a position indicating a reverse drive direction.

6. The method according to claim 5, wherein the shifting element is one of a gear, a shaft or a shifter.

7. The method according to claim 1, wherein said step of sensing a position of a driver's shift lever includes:
providing a contact sensor located adjacent to the driver's shift lever; and
activating the contact sensor when the driver's shift lever is put into a position indicating a reverse drive direction.

8. The method according to claim 7, wherein said step of sensing a gear position of the shiftable sub-transmission includes:
providing a shift sensor located adjacent to a shifting element of the shiftable sub-transmission; and
activating the shift sensor when the shifting element moves to a position indicating a reverse drive direction.

9. A method of controlling a variable transmission system, said method comprising the steps of:
providing a continuously variable transmission, a shiftable sub-transmission in series with an output of the continuously variable transmission, and controller;
sensing a position of a driver's shift lever;
sensing a gear position of the shiftable sub-transmission; and
if only one of said sensing steps indicates a rear travel condition, comparing an engine speed to a threshold value, and based upon the comparison having the controller institute a control algorithm for the variable transmission system.

10. The method according to claim 9, wherein if the engine speed exceeds the threshold value, the controller curbs the engine speed until the engine speed is at least equal to or below the threshold value.

11. The method according to claim 9, wherein if the engine speed exceeds the threshold value, the controller cuts off the ignition.

12. The method according to claim 9, wherein if the engine speed does not exceed the threshold value, the controller controls the continuously variable transmission in a normal, ordinary manner.

13. The method according to claim 9, wherein the continuously variable transmission includes a fixed capacity hydraulic pump and a variable capacity hydraulic motor connected by a hydraulic closed circuit, wherein a gear ratio of the continuously variable transmission is changed by altering an angle of a moveable swash plate.

14. The method according to claim 9, wherein said step of sensing a gear position of the shiftable sub-transmission includes:
providing a shift sensor located adjacent to a shifting element of the shiftable sub-transmission; and
activating the shift sensor when the shifting element moves to a position indicating a reverse drive direction.

15. The method according to claim 14, wherein the shifting element is one of a gear, a shaft or a shifter.

16. The method according to claim 9, wherein said step of sensing a position of a driver's shift lever includes:
providing a contact sensor located adjacent to the driver's shift lever; and
activating the contact sensor when the driver's shift lever is put into a position indicating a reverse drive direction.

17. The method according to claim 16, wherein said step of sensing a gear position of the shiftable sub-transmission includes:
providing a shift sensor located adjacent to a shifting element of the shiftable sub-transmission; and
activating the shift sensor when the shifting element moves to a position indicating a reverse drive direction.

18. A variable transmission system comprising:
a continuously variable transmission;
a shiftable sub-transmission in series with an output of said continuously variable transmission;
a first sensor for detecting when the shiftable sub-transmission is in a reverse drive condition;
a driver's shift lever provided for the driver to select a drive direction;
a second sensor for detecting when said shift lever is in a reverse drive condition; and
a controller connected to said first and second sensors.

19. The variable transmission system according to claim 18, wherein said continuously variable transmission includes a fixed capacity hydraulic pump and a variable capacity hydraulic motor connected by a hydraulic closed circuit, wherein a gear ratio of said continuously variable transmission is changed by altering an angle of a moveable swash plate.

20. The variable transmission system according to claim 18, wherein said first sensor includes a first switch located adjacent to a shifting element of said shiftable sub-transmission; and wherein said second sensor includes a second switch located adjacent to said driver's shift lever.

* * * * *